(12) United States Patent
Garcia et al.

(10) Patent No.: US 6,533,666 B2
(45) Date of Patent: Mar. 18, 2003

(54) INTERMEDIATE STEERING SHAFT FOR MOTOR VEHICLE

(75) Inventors: Jesus Raul Garcia, Juarez (MX); Troy Daenzer, Reese, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/825,513

(22) Filed: Apr. 3, 2001

(65) Prior Publication Data

US 2002/0142850 A1 Oct. 3, 2002

(51) Int. Cl.$^7$ ................................................. F16D 3/76
(52) U.S. Cl. ............................................. 464/75; 464/89
(58) Field of Search ........................... 464/73–76, 89, 464/180; 180/444, 443

(56) References Cited

U.S. PATENT DOCUMENTS

| | | | | |
|---|---|---|---|---|
| 4,424,046 A | * | 1/1984 | Ziegler | 464/74 |
| 4,656,409 A | * | 4/1987 | Shimizu | 180/444 X |
| 5,876,287 A | * | 3/1999 | Barickman | 464/89 X |
| 5,878,832 A | * | 3/1999 | Olgren et al. | 464/89 X |
| 5,924,928 A | * | 7/1999 | Stegman et al. | 464/76 X |

FOREIGN PATENT DOCUMENTS

| | | | |
|---|---|---|---|
| EP | 0 251 078 A2 | * 1/1988 | 464/74 |

* cited by examiner

*Primary Examiner*—Greg Binda
(74) *Attorney, Agent, or Firm*—Edmund P. Anderson

(57) ABSTRACT

An intermediate steering shaft including a tubular shaft element, a solid shaft element telescoped into the tubular shaft element, a pair of universal couplings for connecting the tubular and solid elements to respective ones of a steering shaft and a steering gear input shaft, and a torsionally elastic coupling between the solid shaft element and the corresponding one of the universal couplings. The torsionally elastic coupling includes a torsion sleeve on the solid shaft element, a bushing cavity around the torsion sleeve in a yoke of the universal coupling, and an elastomeric bushing on the torsion sleeve interference fitted in the bushing cavity. A pair of long radial lugs on the torsion sleeve are disposed in respective ones of a pair of notches in the universal coupling yoke with separation therebetween. The elastomeric bushing is relatively soft for maximum torsional vibration isolation at high vehicle speed. At low vehicle speed, the elastomeric bushing twists until the long radial lugs on the torsion sleeve engage the notches in the yoke to rigidly couple the solid shaft element to the yoke parallel to the elastomeric bushing.

3 Claims, 2 Drawing Sheets

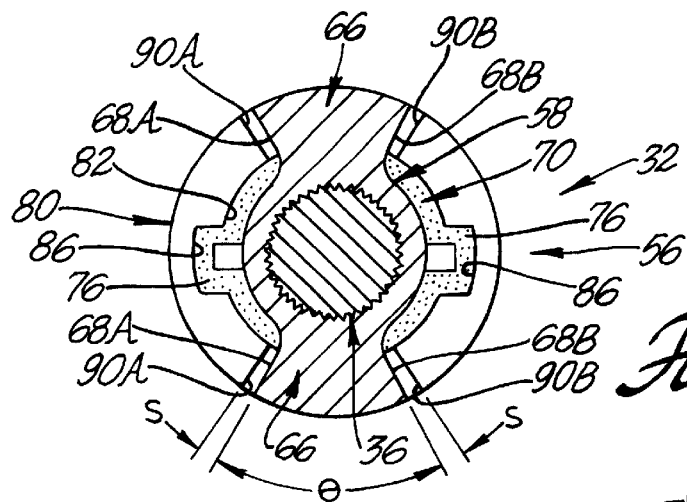
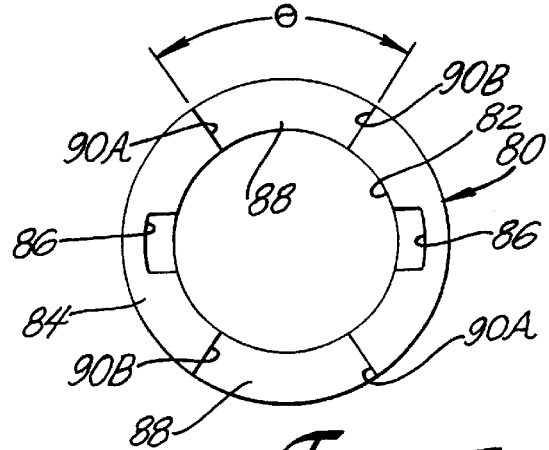
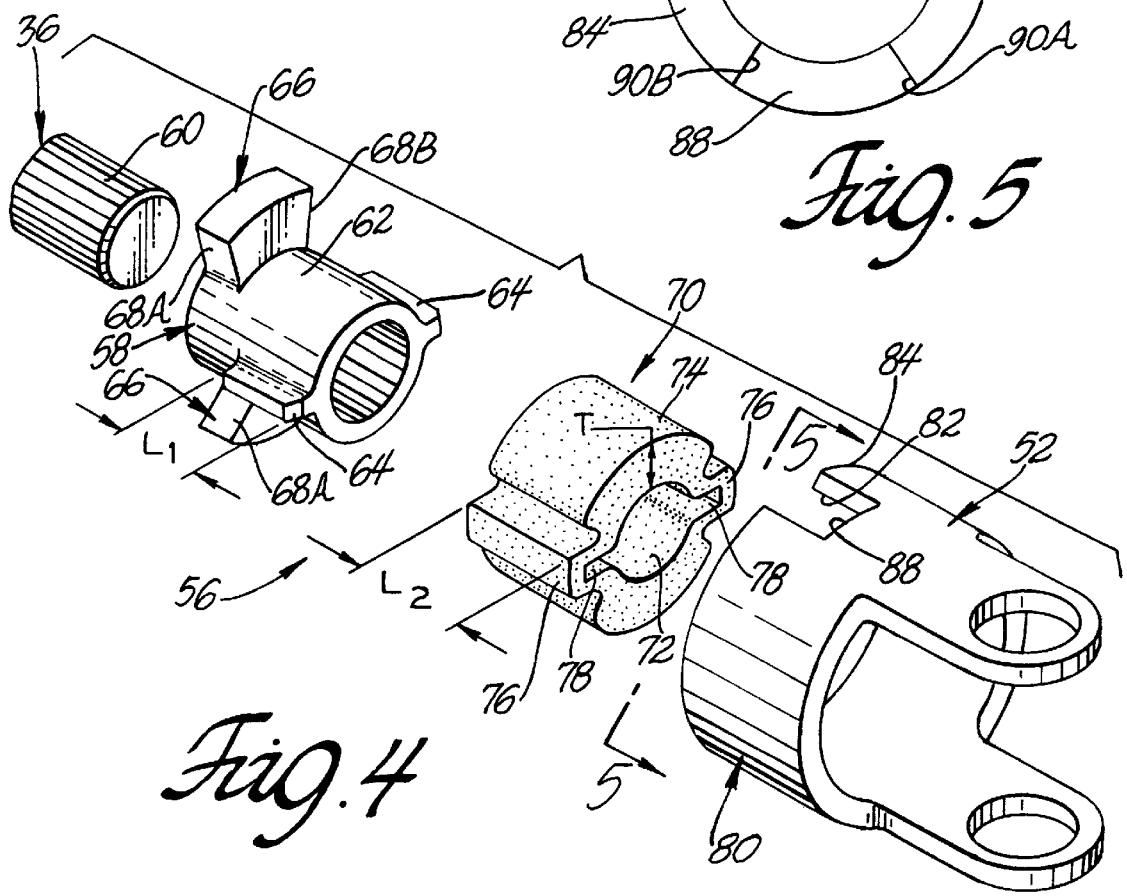

INTERMEDIATE STEERING SHAFT FOR MOTOR VEHICLE

TECHNICAL FIELD

This invention relates to a motor vehicle intermediate steering shaft.

BACKGROUND OF THE INVENTION

A motor vehicle typically includes a steering column, a steering shaft rotatably supported on the steering column, a steering gear remote from the steering column having a steering assist fluid motor, and an intermediate steering shaft for transferring steering torque from the steering shaft to an input shaft of the steering gear. The intermediate steering shaft usually includes a tubular element, a solid element telescoped into the tubular element and rotatable as a unit therewith, a pair of universal couplings for connecting the tubular and solid elements to respective ones of the steering shaft and the steering gear input shaft, and a relatively soft elastomeric bushing between one of the universal couplings and the corresponding one of the tubular and solid elements for interrupting the transfer of torsional vibrations from the steering gear to the steering shaft. When the motor vehicle is driven, the elastomeric bushing twists back and forth and transfers relatively light steering torque, e.g. about 30–40 Nm, between the steering shaft and the intermediate steering shaft because the steering assist fluid motor provides most of the effort necessary to steer the motor vehicle. An emergency coupling parallel to the elastomeric bushing becomes active only if the elastomeric bushing is disabled to assure continuity of torque transfer through the intermediate steering shaft. Such intermediate steering shafts are not suitable for an electric power steering application in which manual steering effort is supplemented by the output torque of an electric motor applied to the steering shaft ahead of the intermediate steering shaft. In such an application, steering torque transferred through the intermediate steering shaft is high, e.g. about 100 Nm, and would repeatedly twist the elastomeric bushing beyond the aforesaid relatively small angular range and thereby destroy its structural integrity. In that circumstance, while the emergency coupling would continue to assure steering torque transfer through the intermediate steering shaft, the corresponding relative angular movement between the steering shaft and the steering gear input shaft would not be commercially acceptable. Simply increasing the torsional stiffness of the elastomeric bushing is not an attractive option because a stiffer bushing would increase the transfer of torsional vibrations from the steering gear to the steering shaft. An intermediate steering shaft according to this invention is a novel improvement over such conventional intermediate steering shafts.

SUMMARY OF THE INVENTION

This invention is a new and improved motor vehicle intermediate steering shaft including a tubular shaft element, a solid shaft element telescoped into the tubular shaft element and rotatable as a unit therewith, a pair of universal couplings for connecting the tubular and solid shaft elements to respective ones of a steering shaft on a steering column and an input shaft of a steering gear, and a torsionally elastic coupling between the solid shaft element and the corresponding one of the universal couplings. The torsionally elastic coupling includes a torsion sleeve rigidly attached to the solid shaft element, a bushing cavity around the torsion sleeve in a yoke of the universal coupling, and a relatively soft elastomeric bushing on the torsion sleeve interference fitted in the bushing cavity. A pair of long radial lugs on the torsion sleeve are disposed in respective ones of a pair of notches in the universal coupling yoke with separation therebetween. The elastomeric bushing is relatively soft for maximum torsional vibration isolation at high vehicle speed. At low vehicle speed, the elastomeric bushing twists until the long radial lugs on the torsion sleeve engage the notches in the yoke to rigidly couple the solid shaft element to the yoke parallel to the elastomeric bushing. The long lugs and the notches thus cooperate to prevent the elastomeric bushing from twisting beyond an angle consistent with maximum durability of the bushing.

BRIEF DESCRIPTION OF THE DRAWINGS

FIG. 3 is a sectional view taken generally along the plane indicated by lines 3—3 in FIG. 2;

FIG. 4 is an exploded perspective view of a torsionally elastic coupling of the motor vehicle intermediate steering shaft according to this invention; and FIG. 5 is a view taken generally along the plane indicated by lines 5—5 in FIG. 4.

DESCRIPTION OF THE PREFERRED EMBODIMENT

Figure 1:
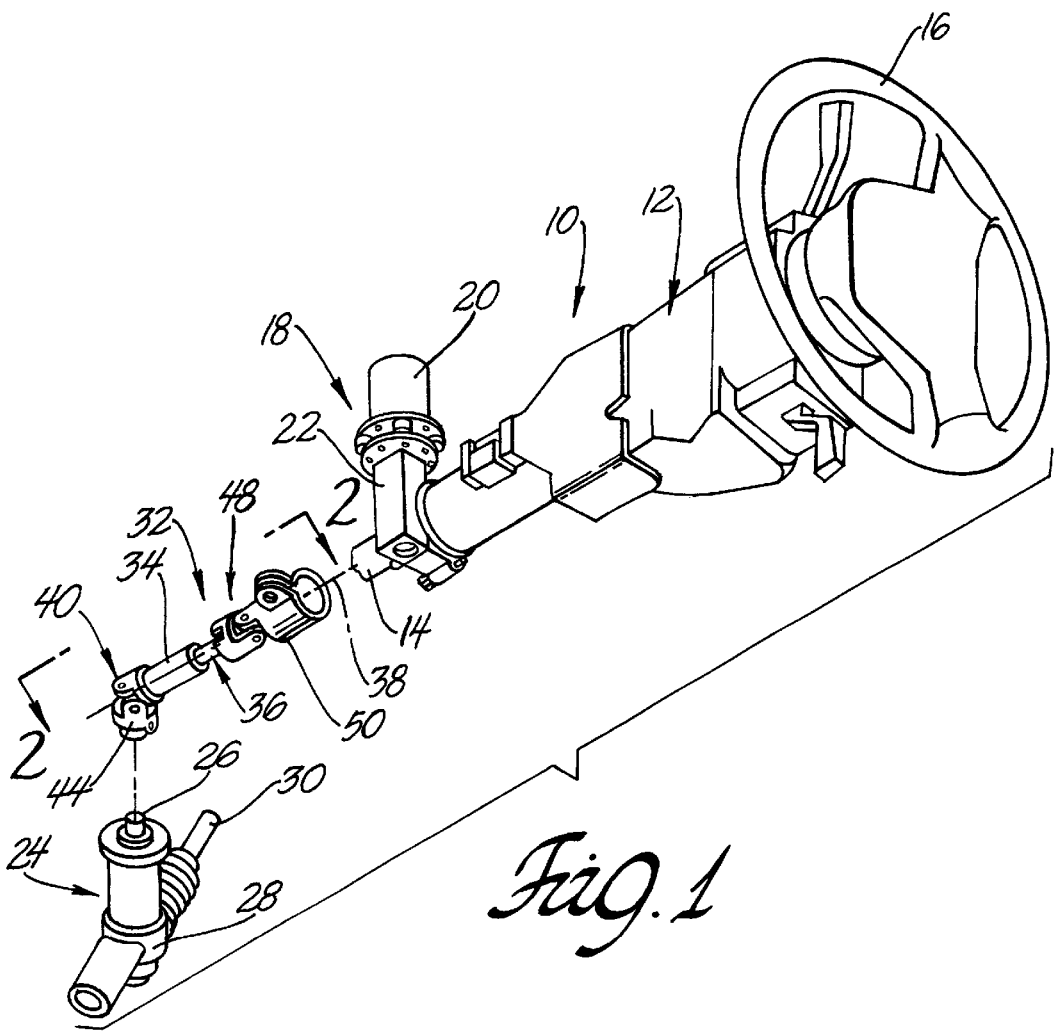
FIG. 1 is a perspective view of a motor vehicle intermediate steering shaft according to this invention between a steering column and a steering gear.

Referring to FIG. 1, a motor vehicle steering column 10 is supported on a body, not shown, of the motor vehicle and includes a mast jacket 12 and a steering shaft 14 rotatably supported on the mast jacket. A steering hand wheel 16 is rigidly attached to the steering shaft for rotation as a unit therewith. An electric power assist apparatus 18 on the mast jacket 12 includes an electric motor 20 and a speed reducer 22 operable to transfer torque from the electric motor to the steering shaft 14 to supplement manual effort applied at the steering hand wheel 16.

A steering gear 24 on the motor vehicle body remote from the steering column includes an input shaft 26 rotatably supported on a housing 28 of the steering gear and a rack bar 30 supported on the housing for back and forth linear translation in response to rotation of the input shaft. Opposite ends, not shown, of the rack bar are linked to dirigible wheels of the motor vehicle for steering the motor vehicle in the usual fashion in response to rotation of the input shaft 26. An intermediate steering shaft 32 according to this invention spans the gap between the steering shaft 14 and the steering gear input shaft 26.

The intermediate steering shaft 32 includes a tubular shaft element 34 and a solid shaft element 36 telescoped into the tubular shaft element and coupled thereto by splines or the like for unitary rotation about and for relative linear translation in the direction of a longitudinal centerline 38 of the intermediate steering shaft. A lower universal coupling 40 of the intermediate steering shaft includes an inner yoke 42 rigidly attached to the tubular shaft element 34, an outer yoke 44 clamped to the steering gear input shaft 26, and a cross or spider 46, FIG. 2, between the yokes. An upper universal coupling 48 of the intermediate steering shaft includes an outer yoke 50 clamped to the steering shaft 14, an inner yoke 52, and a cross or spider 54 between the yokes.

Figure 2:
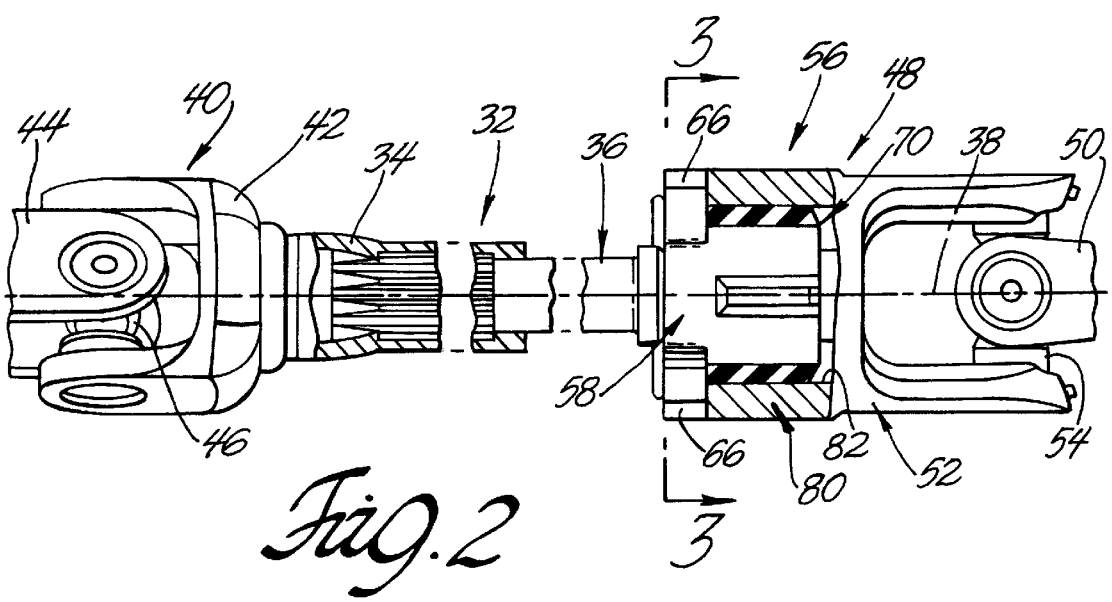
FIG. 2 is a partially broken-away view taken generally along the plane indicated by lines 2—2 in FIG. 1.

As seen best in FIGS. 2 and 4, a torsionally elastic coupling 56 is interposed between the inner yoke 52 of the upper universal coupling 48 and the solid shaft element 36 and includes a tubular torsion sleeve 58 supported on a distal end 60 of the solid shaft element for rotation as a unit therewith about the longitudinal centerline 38 of the intermediate steering shaft. A cylindrical outside surface 62 of the torsion sleeve is interrupted by a diametrically opposite pair of short radial lugs 64 each having a length dimension "$L_1$", FIG. 4, constituting a fraction of the length of the cylindrical outside surface. The cylindrical outside surface 62 is further interrupted by a diametrically opposite pair of long radial lugs 66 at an end of the torsion sleeve beyond the length dimension $L_1$ of the short lugs and, therefore, not overlapped by the short lugs. Each of the long lugs 66 has a pair of opposite side surfaces 68A,68B which diverge at an angle Θ, FIG. 3.

A tubular elastomeric bushing 70 of the torsionally elastic coupling 56 includes a cylindrical inside surface 72 and a cylindrical outside surface 74 separated from the cylindrical inside surface by a wall thickness dimension "T", FIG. 4, of the bushing. The cylindrical outside surface 74 is interrupted by a pair of diametrically opposite resilient lugs 76 integral with the elastomeric bushing. The cylindrical inside surface 72 is interrupted by a pair of grooves 78 under the resilient lugs 76. The elastomeric bushing 70 has a length dimension $L_2$, FIG. 4, corresponding to the length dimension $L_1$ of the short lugs 64 on the cylindrical outside surface of the torsion sleeve. The elastomeric bushing is preferably over-molded directly around the torsion sleeve so that the cylindrical inside surface 72 of the bushing and the cylindrical outside surface 62 of the torsion sleeve are attached by a mechanical, adhesive-like bond with the short lugs 64 on the torsion sleeve in the grooves 78 and, therefore, embedded in respective ones of the resilient lugs 76 on the elastomeric bushing. Other bonding techniques, e.g. adhesives, for uniting the cylindrical inside and outside surfaces 72,62 are within the scope of this invention.

As seen best in FIGS. 3–5, the inner yoke 52 of the upper universal coupling 48 includes a body 80 having a cylindrical bushing cavity 82 therein constituting an element of the torsionally elastic coupling 56. The bushing cavity 82 is open through an annular end wall 84 of the yoke body 80 and is interrupted by a pair of diametrically opposite grooves 86 each also open through the annular end wall 84. The annular end wall 84 is further interrupted by a pair of diametrically opposite notches 88 in the yoke body each having a pair of side surfaces 90A,90B diverging at the aforesaid angle Θ, FIG. 5.

The distal end 60 of the solid shaft element 36, with the torsion sleeve 58 and the elastomeric bushing 70 thereon, overlaps the yoke body 80 and protrudes into the bushing cavity 82. The cylindrical outside surface 62 of the torsion sleeve is separated from the bushing cavity by less than the wall thickness dimension T of the elastomeric bushing so that elastomeric bushing is interference fitted in the bushing cavity and radially compressed between the latter and the cylindrical outside surface of the torsion sleeve. Additionally, the in respective ones of the grooves 86 in the bushing cavity. The elastomeric bushing defines a center position, FIG. 3, of the yoke 52 relative to the solid shaft element 36 characterized by a plurality of equal separation dimensions "S", FIG. 3, between the side surfaces 68A,68B of the long lugs 66 and the facing ones of the side surfaces 90A,90B of the notches 88 in the yoke body 80. The elastomeric bushing resiliently resists rotation of the yoke 52 from its center position relative to the solid shaft element about the longitudinal centerline 38 of the intermediate steering shaft.

When manual effort is applied to the steering hand wheel 16, the elastomeric bushing 70 commences to twist between the torsion sleeve 58 and the yoke body 80 because friction between the dirigible road wheels connected to the steering gear input shaft 26 through the rack bar 30 holds the tubular and solid shaft elements 34,36 stationary relative to the yoke 52. In response to relative rotation between the yoke 52 and the solid shaft element 36, a control module, not shown, on the vehicle may turn on the electric motor 20 to apply additional torque to the steering shaft 14 through the speed reducer 22 and thereby supplement the manual effort applied at the steering hand wheel.

Because the speed reducer 22 is connected to the steering shaft 14 ahead or "upstream" of the intermediate steering shaft 32, all of the steering torque necessary to turn the steering gear input shaft 26 is transferred from the yoke 52 to the solid shaft element 36 through the torsionally elastic coupling 56. When the motor vehicle is driven at highway speed, only low steering torque, e.g. about 30–40 Nm, is necessary to turn the dirigible road wheels and the aforesaid control module turns off the electric motor 20. Such low steering torque is then transferred between the yoke 52 and the solid shaft element 36 through the relatively soft elastomeric bushing 70 with the bushing twisting through a proportionally small angle, not shown, less than a maximum angle of twist defined by the separation dimension S between facing ones of the side surfaces on the long lugs and the side surfaces of the notches in the yoke body. Thus, at highway speed, the motor vehicle is steered through the elastomeric bushing 70 while the latter concurrently interrupts the transfer of torsional vibrations from the steering gear input shaft 26 to steering shaft 14 for maximum operator comfort.

Conversely, when the motor vehicle is stopped or moving slowly, high steering torque, e.g. 100 Nm, is necessary to turn the dirigible road wheels and torsional vibration of the steering gear input shaft is ordinarily negligible. In that circumstance, the control module turns on the electric motor 20 to supplement the manual effort applied at the steering hand wheel 16. When the combined electric motor torque and manual effort is thereafter transferred through the relatively soft elastomeric bushing 70, the bushing quickly twists through the aforesaid maximum twist angle defined by the separation dimension S. Then, diagonally opposite ones of the side surfaces 68A,68B on the long lugs seat on facing ones of the side surfaces 90A,90B of the notches 88 to establish a direct, rigid couple between the torsion sleeve 58 and the yoke body 80 parallel to the resilient couple afforded by the elastomeric bushing 70. The elastomeric bushing cushions the engagement between the long lugs and the notches to suppress audible noise. Importantly, the separation dimension S is selected to permit the elastomeric bushing to twist only through a relatively small angle consistent with maximum durability of the bushing.

Having thus described the invention, what is claimed is:
1. A motor vehicle intermediate steering shaft comprising:
   a shaft element,
   a yoke,
   a torsion sleeve rigidly attached to the shaft element,
   an elastomeric coupling operable to transfer steering torque between the yoke and the torsion sleeve while twisting about a longitudinal centerline of the intermediate steering shaft through an angle proportional to the magnitude of the steering torque and to interrupt the transfer of torsional vibration between the torsion sleeve and the yoke, and a rigid coupling operable to directly transfer steering torque through direct material-to-material contact between the yoke and the torsion sleeve parallel to the elastomeric coupling when the angle of twist of the elastomeric coupling attains a predetermined magnitude;

wherein the elastomeric coupling comprises:

a cylindrical outside surface on the torsion sleeve, a pair of diametrically opposite short radial lugs on the cylindrical outside surface of the torsion sleeve each having a length dimension constituting a fraction of the length of the cylindrical outside surface on the torsion sleeve, a tubular elastomeric bushing having a diametrically opposite pair of integral resilient lugs on a cylindrical outside surface thereof and a pair of grooves in a cylindrical inside surface thereof under respective ones of the pair of integral resilient lugs and a length dimension substantially equal to the length dimension of the pair of short radial lugs, an attachment operable to rigidly attach the cylindrical inside surface of the elastomeric bushing to the cylindrical outside surface of the torsion sleeve with the pair of short radial lugs in respective ones of the pair of grooves in the cylindrical inside surface of the elastomeric bushing and thereby embedded in respective ones of the pair of integral resilient lugs, and a bushing cavity in the yoke having the elastomeric bushing interference fitted therein with the pair of integral resilient lugs in respective ones of a pair of grooves in the bushing cavity parallel to the longitudinal centerline of the intermediate steering shaft.

2. The motor vehicle intermediate steering shaft recited in claim 1 wherein:

the tubular elastomeric bushing is over-molded directly onto the cylindrical outside surface of the torsion sleeve.

3. The motor vehicle intermediate steering shaft recited in claim 2 wherein the rigid coupling comprises:

a pair of diametrically opposite notches in the yoke open through an end thereof each having a pair of side surfaces, a pair of diametrically opposite integral long radial lugs on the cylindrical outside surface of the torsion sleeve beyond the fraction of the length of the cylindrical outside surface spanned by the integral short radial lugs disposed in respective ones of the pair of notches in the yoke, and a pair of side surfaces on each of the pair long radial lugs facing the pair of side surfaces of the corresponding one of the pair notches in the yoke and separated therefrom by respective ones of a plurality of equal separation dimensions in a center position of the yoke relative to the torsion sleeve.

\* \* \* \* \*